United States Patent [19]

Ohno

[11] Patent Number: 4,478,498

[45] Date of Patent: Oct. 23, 1984

[54] FOLDABLE BINOCULAR ASSEMBLY

[76] Inventor: Kaisaku Ohno, No. 7-4, Minamihonmachi 2-chome, Urawa-shi, Saitama-ken, Japan

[21] Appl. No.: 472,823

[22] Filed: Mar. 7, 1983

[30] Foreign Application Priority Data

Mar. 8, 1982 [JP] Japan ................................. 57-32238

[51] Int. Cl.³ .......................... G02B 23/18; G02B 7/02
[52] U.S. Cl. ..................................... 350/546; 350/145; 350/250
[58] Field of Search ............... 350/546, 140, 145, 250; 40/365

[56] References Cited

U.S. PATENT DOCUMENTS 4,239,328 12/1980 Justice et al. ....................... 350/546
4,443,071 4/1984 Ueda ................................... 350/546

Primary Examiner—Jon W. Henry
Attorney, Agent, or Firm—Sughrue, Mion, Zinn, Macpeak & Seas

[57] ABSTRACT

A foldable binocular which comprises two rectangular members, three trapezoidal members and three pairs of trapezoidal flaps for geometrically special formation and is assembled into hexahedral frustum of a pyramid. This geometrically specific construction ensures durability and accurate parallelism of optical axes. The binocular can be easily folded and stored in a case when not used.

4 Claims, 13 Drawing Figures

FOLDABLE BINOCULAR ASSEMBLY

BACKGROUND OF THE INVENTION

1. Field of the Invention

This invention relates to a binocular assembly and, more particularly, to such a binocular assembly in foldable formation.

2. Description of the Prior Art

Several binoculars of the type described above have been proposed which are designed for use with an observer's eyes to give enhanced views of distant objects. In general, such foldable binoculars are made of comparatively thin material such as cardboard so as to be rendered less bulky and more handy and economical.

However, a problem of great concern experienced with the existing techniques in that the foldable binoculars are not entirely satisfactory from their geometrical structure and hence are susceptible to reduce durability or crush proofing, often resulting in misaligned parallelism of the optical axes between the object lenses and the eyepieces as well as accidental intrusion of light into the binocular body from the outside. The conventional foldable binoculars find extremely limited application as toys for children.

A need therefore continues to exist for the development of a binocular assembly of the foldable type which is operable with satisfactory results.

SUMMARY OF THE INVENTION

It is an object of the present invention to provide an improved foldable binocular assembly which is free from the difficulties of the prior art foldable binoculars.

Another object of the invention is to provide an improved foldable binocular assembly which is so constructed as to be geometrically ideal and which, despite the formation with comparatively thin material, can achieve the desired requirements including sufficient durability, accurate parallelism of optical axes and proper evasion of light intrusion from the outside such that the binocular assembly is used with utmost simplicity and convenience as an aid for watching various sports and admiring plays and theaters, a teaching aid and the like.

According to the invention, there is provided a binocular assembly of comparatively thin material in foldable formation, comprising: (a) a first rectangular member constituted of a pair of openings disposed therein in spaced-apart relation to each other, a lens plate attached onto an internal surface of said first rectangular member and defining two object lenses with said paired openings, and two trapezoidal flaps of substantially identical configuration extending oppositely from both sides of said first rectangular member via two lengthwise lines of fold thereof; (b) a first trapezoidal member connected upwardly to said first rectangular member along one widthwise line of fold thereof, and including two trapezoidal flaps of substantially identical configuration extending oppositely from both sides thereof via two lengthwise lines of fold thereof, said flaps each having an elongate overlap portion of substantially identical configuration connected thereto along a lengthwise line of fold thereof; (c) a second trapezoidal member being substantially identical in configuration and opposite to said first trapezoidal member and connected to said first rectangular member along the other widthwise line of fold thereof; (d) a second rectangular member connected along one widthwise line of fold thereof to said second trapezoidal member, and including a pair of openings disposed therein in spaced-apart relation to each other and in alignment with said first paired openings of said first rectangular member, a lens plate attached onto an internal surface of said second rectangular member and defining two eyepieces with said second paired openings, and two trapezoidal flaps of substantially identical configuration extending oppositely from both sides of said second rectangular member via two lengthwise lines of fold thereof; and (e) a third trapezoidal member being substantially identical in configuration to said first and second trapezoidal members and connected downwardly to said second rectangular member along the other widthwise line of fold thereof, whereby said binocular when assembled is in the form of a hexahedral frustum of a pyramid.

BRIEF DESCRIPTION OF THE DRAWINGS

A more complete appreciation of the invention and many of the attendant advantages thereof will be readily obtained as the same becomes better understood with reference to the following detailed description when considered in connection with the accompanying drawings, wherein.

DETAILED DESCRIPTION OF THE PREFERRED EMBODIMENTS

Figure 1A:
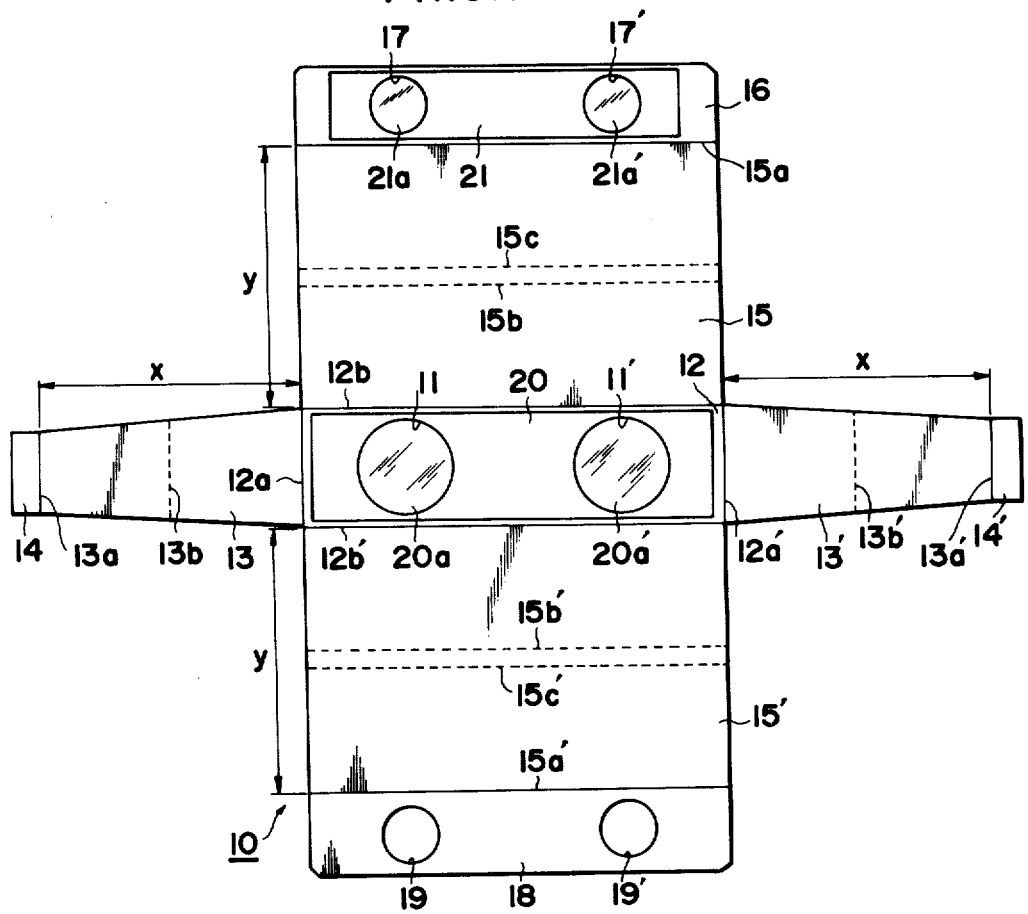
FIG. 1(a) is a plan view of a foldable binocular according to the prior art, the box being expanded.

FIG. 1(a) through FIG. 1(e), inclusive, illustrate a typical prior art foldable binocular assembly. As best shown in FIG. 1(a), the binocular has a body 10 made of inexpensive material such as cardboard. The body 10 comprises a first rectangular member 12 having a pair of spaced-apart circular openings 11, 11' disposed therein, and a rectangular flat lens plate 20 bonded onto an inner surface of the member 12 and defining two object lenses 20a, 20a' with the lens plate 20. Located transversely of the member 12 are two trapezoidal flaps 13, 13' extending oppositely from both sides of the member 12 via two lengthwise lines of fold 12a, 12a' thereof. The flaps 13, 13' are each provided at its outer end with an elongate overlap 14 (14') connected to the flap 13 (13') along a lengthwise line of fold 13a (13a') thereof.

Further, a second rectangular member 15 and a third rectangular member 15' of substantially identical configuration extending oppositely longitudinally from the first rectangular member 12 via two widthwise lines of fold 12b, 12b' thereof. Connected upwardly to the second rectangular member 15 along one widthwise of line fold 15a thereof is a fourth rectangular member 16 having a pair of spaced-apart circular openings 17, 17' disposed therein, and connected downwardly to the third rectangular member 15' along the other widthwise line of fold 15a' is a rectangular overlap 18 which is substantially identical in configuration to the fourth member 16 and has a pair of circular holes 19, 19' disposed therein, the holes being substantially identical to and in alignment with the openings 17, 17'. Similarly in case of the object lenses 20a, 20a', a rectangular flat lens plate is bonded onto an inner surface of the fourth rectangular member 16 and defines two eyepieces 21a, 21a' with the openings 17, 17'.

A noteworthy arrangement of the prior art binocular is such that the width x of each of the flaps 13, 13' is substantially equal to the height y of each of the second and third members 15, 15'. The flaps 13, 13' are each provided generally at its central position with a lengthwise fold line 13b (13b') in parallel with the fold line 12a (12a') of the first member 12. Defined substantially centrally of each of the second and third members 15, 15' are two adjacent widthwise lines of fold 15b, 15b' (15c, 15c') in parallel with the fold lines 12b, 12b' of the first member 12.

Figure 1B:
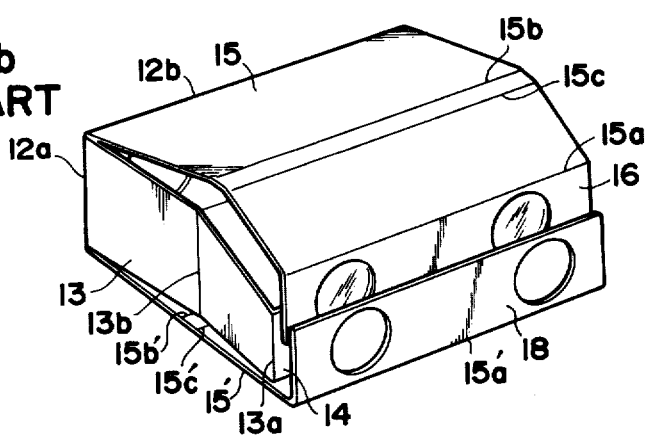
FIG. 1(b) is a perspective view showing the binocular of FIG. 1(a) when assembled but before adhesively finished.
Figure 1C:
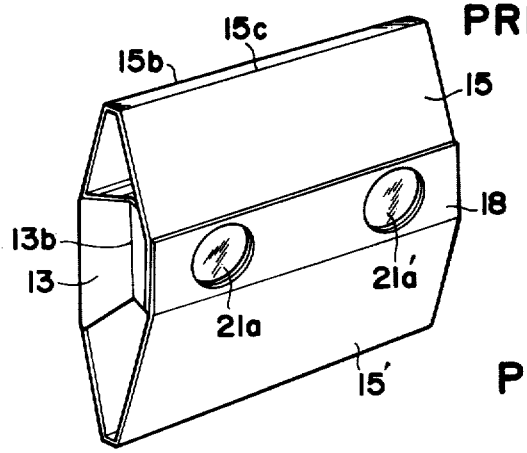
FIG. 1(c) is a perspective view showing the manner in which the binocular of FIG. 1(a) is folded.

In assembling the binocular, the second and third members 15, 15' as well as the flaps 13, 13' are first folded inwardly along the widthwise fold lines 12b, 12b' and the lengthwise fold lines 12a, 12a', respectively, of the first member 12. Subsequently, the elongate overlaps 14, 14' are inwardly folded along the lengthwise fold lines 13a, 13a' of the flaps 13, 13', whereupon the fourth member 16 and the rectangular overlap 18 are folded in turn along the fold line 15a of the second member 15 and the fold line 15a' of the third member 15' in superposed relation to each other. The fourth member 16 is then bonded at its outer surface to the inner surface of the overlap 18, whereas the elongate overlaps 14, 14' are each bonded at its outer surface to both inner ends of the fourth member 16 as shown in FIG. 1(b).

The flaps 14, 14' are further forced inwardly along their lengthwise fold lines 13b, 13b' with the result that the second and third members 15, 15' are oppositely angularly foldable along the paired widthwise fold lines 15b, 15c (15b', 15c'). This condition is better understood from a consideration of FIG. 1(c).

Figure 1D:
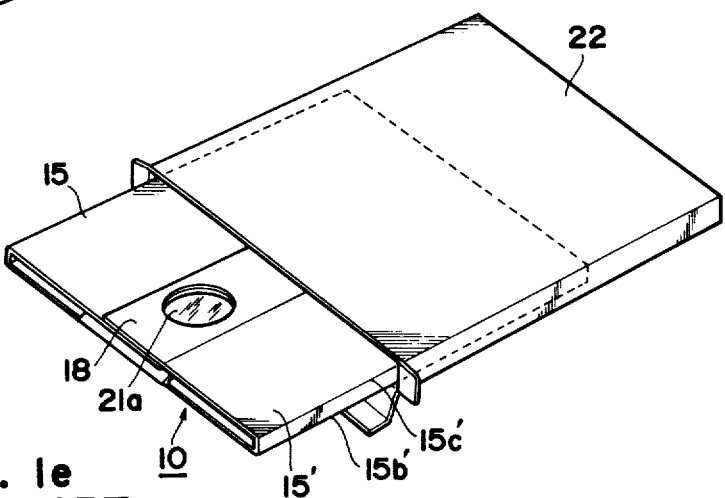
FIG. 1(d) is a perspective view showing the manner in which the binocular of FIG. 1(a) after folded is being inserted into a case.

The binocular when in non-use may be folded into flat plate form by permitting the first or object lens-carrying member 12 to be pressed against the fourth or eyepiece-carrying member 16, in which instance the halves of each of the second and third members 15, 15' become directly adjacent to each other. Thus, the binocular is insertable into a box-like case 22 as shown in FIG. 1(d).

Figure 1E:
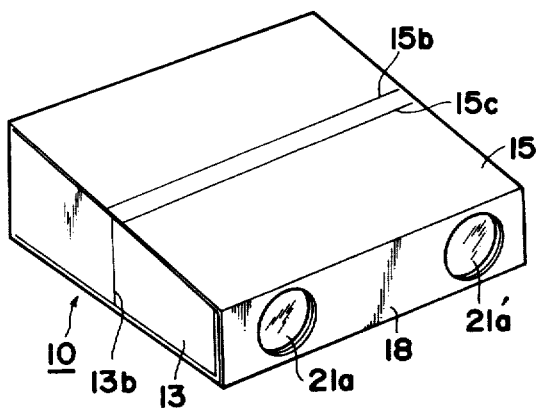
FIG. 1(e) is a perspective view showing the binocular of FIG. 1(a) after completely finished and in use.

When in use, pressing the flatly folded binocular sideways to thereby centrally diverge the halves of each of the second and third members 15, 15' and the halves of each of the flaps 13, 13' so that all of these halves can be made flat and transformed into box-like final shape as shown in FIG. 1(e).

However, the thus assembled binocular is interiorly hollow without any means arranged for supporting the six faces of the binocular box. Accordingly, this binocular product is less durable and is prone to become easily deformable particularly not only in the second and third members 15, 15' even by applying delicate force with an observer's fingers, with eventual deformation of the whole box. This would result in misaligned parallelism of the optical axes between the object lens and the eyepieces, thus rendering the binocular inoperative. Another disadvantage encountered with the prior art is that much light would intrude into the box from the outside through a gap left peripherally between the second and third members 15, 15' and the flaps 13, 13'.

A further disadvantage is that the observer would have to grasp the box with his both hands in actual use since the box often restores to its foldable state. The box is folded in one plane when not in use, and folding grows into a habit with the box at the fold lines 15b, 15c and 15b', 15c' of the second and third members 15, 15' and at the fold lines 13b, 13b' of the flaps 13, 13'. Resultingly, such binocular is not suitable for single-handed use.

As described above, the prior art foldable binocular assembly is far from practically acceptable and is at most useful as children's toy.

A complete understanding of the present invention will be obtained by the following specific examples which are provided herein for purposes of illustration only and are not construed as limiting to the invention.

Figure 2:
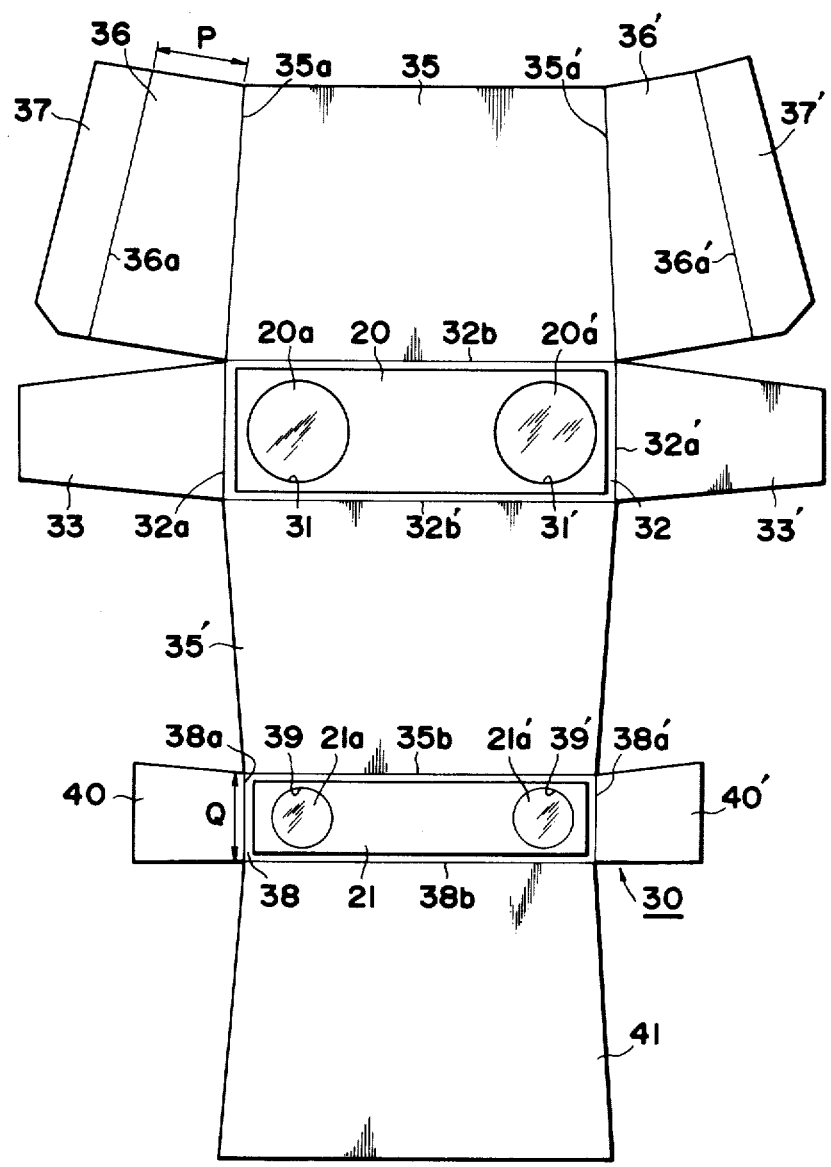
FIG. 2 is a plan view of a foldable binocular embodying the present invention, the body being expanded for better illustration.

In FIG. 2, a foldable binocular assembly according to the invention has a body 30 made of comparatively thin, inexpensive material such for example as of cardboard. The body 30 comprises a first rectangular member 32 including a pair of openings 31, 31' disposed therein in spaced-apart relation to each other. A rectangular lens plate 20 is attached or otherwise bonded onto an internal surface of the member 32 and defining two object lenses 20a, 20a' with the paired openings 31, 31'. Two trapezoidal flaps 33, 33' of substantially identical configuration extend oppositely from both sides of the member 32 via two lengthwise lines of fold 32a, 32a' thereof.

A first trapezoidal member 35 is connected upwardly to the first rectangular member 32 along one widthwise line of fold 32b thereof. Two trapezoidal flaps 36, 36' of substantially identical configuration extend oppositely from both sides of the member 35 via two lengthwise lines of fold 35a, 35a' thereof. The flaps 36, 36' each include an elongate overlap portion 37 (37') of substantially identical configuration connected thereto along a lengthwise line of fold 36a (36a') thereof.

Connected to the first rectangular member 32 along the other widthwise line of fold 32b' thereof is a second trapezoidal member 35' which is substantially identical in configuration and opposite to the first trapezoidal member 35. The member 35' is connected to the member 32 along the other widthwise line of fold 32b' thereof.

To the second trapezoidal member 35' is connected a second rectangular member 38 along one widthwise line of fold 35b of the member 35'. The member 38 has a pair of openings 39, 39' disposed therein in spaced-apart relation to each other and in alignment with the first paired openings 31, 31'. A rectangular lens plate 21 is bonded onto an internal surface of the member 38 and defining two eyepieces 21a, 21a' with the second paired openings 39, 39'. Two trapezoidal flaps 40, 40' of substantially identical configuration extend oppositely from both sides of the member 38 via two lengthwise lines of fold 38a, 38a' thereof.

Disposed downwardly to the second rectangular member 38 via the other widthwise line of fold 38b thereof is a third trapezoidal member 41 which is substantially identical in configuration to the first and second trapezoidal members 35, 35'.

Of noteworthy importance is the fact that each of the flaps 33, 33' of the first rectangular member 32 is tapered generally at the same angle as the folds 36a (36a') of the flaps 36, 36' of the first trapezoidal member 35. Moreover, the second rectangular member 38 has a height Q equal to the width P of the upper side of each of the flaps 36, 36'.

Figure 3:
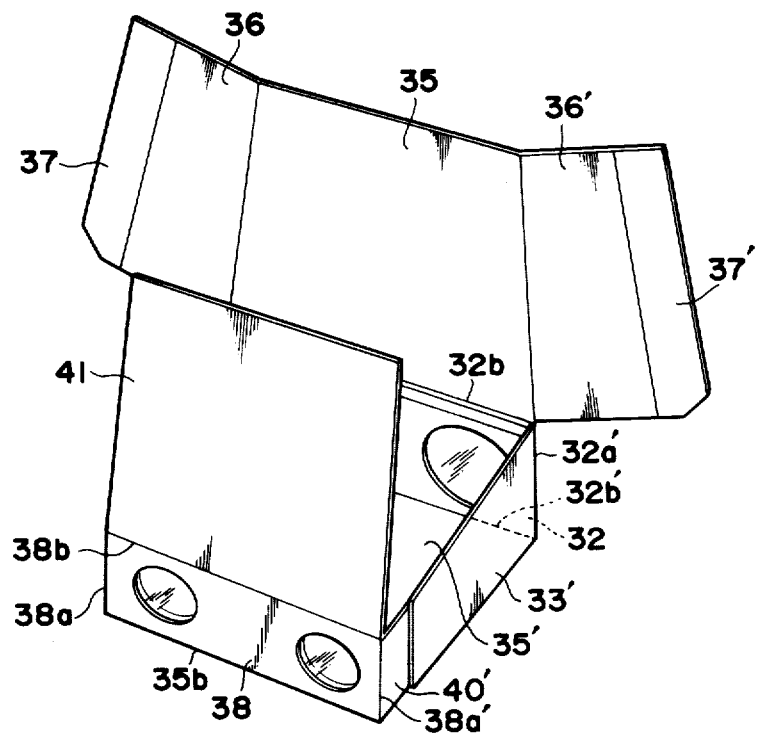
FIGS. 3 and 4 are perspective views, respectively, showing the manner in which the binocular of FIG. 2 is assembled.

In assembling the binocular for actual use, as best shown in FIG. 3, the body 30 is first folded into upstanding form along the fold line 35b of the second rectangular member 38, whereupon the trapezoidal flaps 40, 40' are inwardly folded along the fold lines 38a, 38a' of the member 38. The first trapezoidal member 35 coupled with the first rectangular member 32 is allowed to stand upwardly along the fold line 32b' of the member 32, followed by the inward folding of the trapezoidal flaps 33, 33' of the member 20 along the fold line 32a, 32a' thereof. Thereafter, the third trapezoidal member 41 is caused to lie inwardly along the fold line 38b of the member 38.

Figure 4:
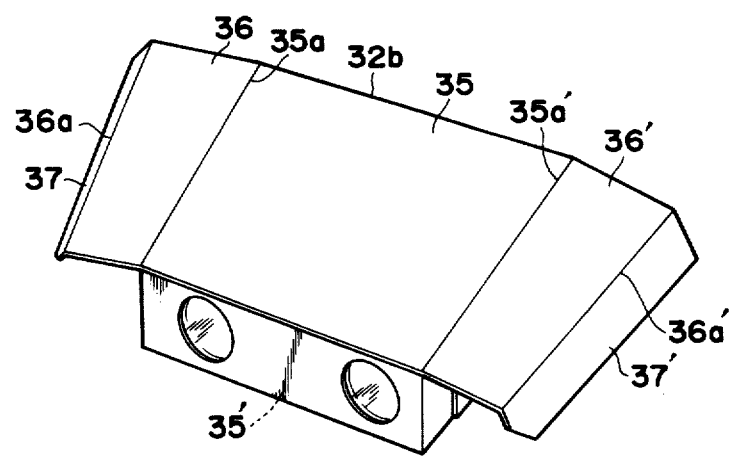
Figure 5:
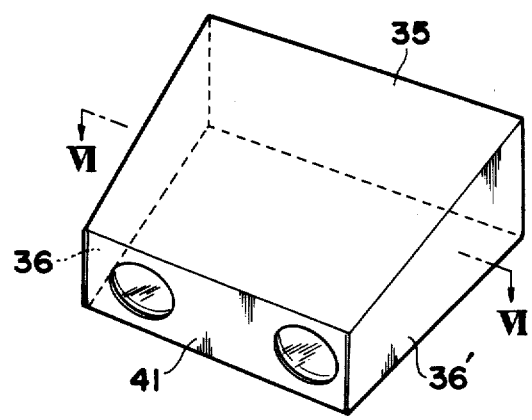
FIG. 5 is a perspective view showing the binocular of FIG. 2 after completely assembled and finished.

The first trapezoidal member 35 is superposed on the member 41 along the fold line 32b of the member 32, and the trapezoidal flaps 36, 36' of the member 35 downwardly along the fold lines 35a, 35a' as shown in FIG. 4. Lastly, the elongate overlap portions 37, 37' of the flaps 36, 36' are inwardly folded along the fold lines 36a, 36a' thereof and inserted slidably onto the inner surface of the member 35'. As shown in FIG. 5, the binocular thus assembled takes the form of a hexahedral frustum of a pyramid.

Figure 6:
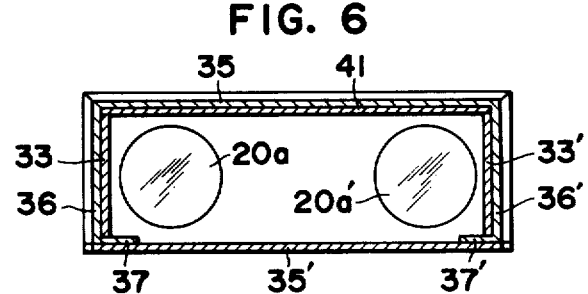
FIG. 6 is a cross-sectional view taken on line VI—VI of FIG. 5.

More particularly, the member 41 is in abutted engagement with the flaps 33, 33', and the member 35 and the member 41 are in contact with each other in back-to-front relation. As is clear from FIG. 6, the flaps 40, 40', the flaps 33, 33' and the flaps 36, 36' are superimposed one on another at both sides of the binocular with the overlaps 37, 37' inserted at both sides of and onto the inner surface of the member 35'. The binocular according to the invention is advantageous in that the constituent members, flaps and overlaps are cooperatively supported when assembled.

This geometrically specific construction ensures durability and hence accurate parallelism of optical axes and proper evasion of light intrusion into the binocular body from the outside.

It should be noted that in contrast to the prior art binocular composed mainly of rectangular members (four faces) (FIG. 1), the binocular of the invention is constituted mainly of trapezoidal members (four faces) and thus is less susceptible to deformation.

Figure 7:
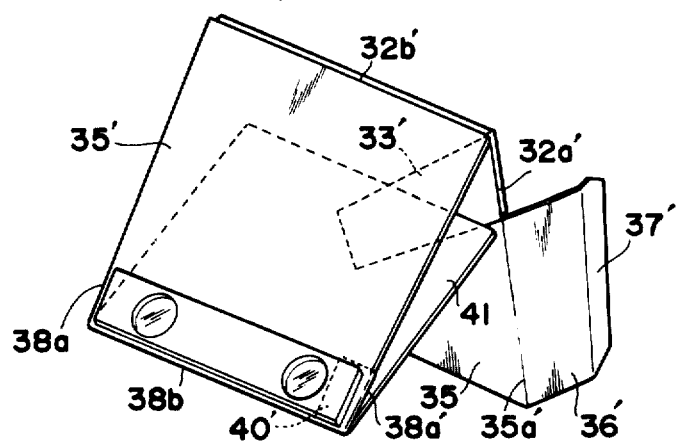
FIG. 7 is a perspective view showing the manner in which the binocular of FIG. 2 is folded.
Figure 8:
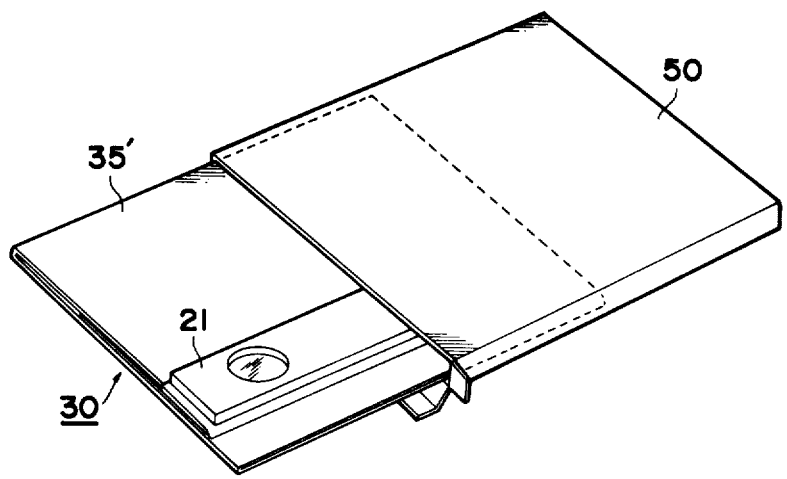
FIG. 8 is a perspective view showing the manner in which the binocular of FIG. 2 after folded is being accommodated into a case.

When not in use, the binocular is first folded into two parts with the flaps 40, 40' and the flaps 33, 33' outwardly directed along the fold lines 38a, 38a' and the fold lines 32a, 32a', respectively. The three members 35, 35' and 41 are then folded outwardly along the fold lines 38b and 32b', and the flaps 36, 36' inwardly along the fold lines 35a, 35a' (FIG. 7). The binocular is thus accommodated into a box-like case 50 for handy carriage (FIG. 8).

Figure 9:
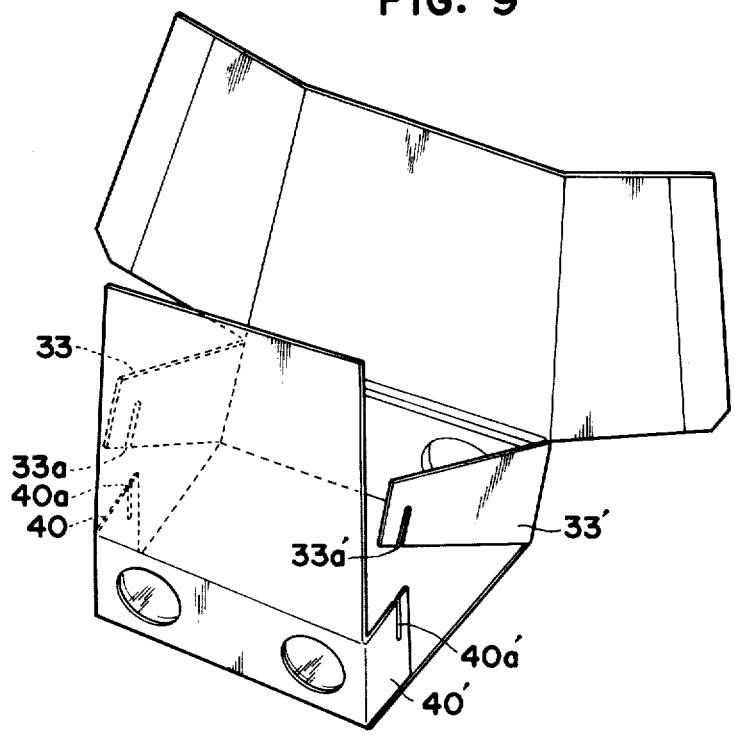
FIG. 9 is a perspective view of a modification of the foldable binocular embodying the invention.

FIG. 9 shows a modification of the binocular assembly according to the invention. A modified binocular includes two trapezoidal flaps 33, 33' with a slit at 33a, 33a' and two similar flaps 40, 40' with a slit at 40a, 40a'. These slits are arranged to bite each other for firm engagement with one another.

Where it becomes desirable, two circular lenses may be used instead of a rectangular lens plate. These plates and circular lenses are preferably made of synthetic resin, for example, acrylic resin in terms of safety and production economy.

This invention now being fully described, it is apparent to those versed in the art that many changes and modifications can be made to the invention without departing the spirit or scope of the invention set forth herein.

What is claimed is:

1. A binocular assembly of comparatively thin material in foldable formation, comprising:
   (a) a first rectangular member constituted of a pair of openings disposed therein in spaced-apart relation to each other, a lens plate attached onto an internal surface of said first rectangular member and defining two object lenses with said paired openings, and two trapezoidal flaps of substantially identical configuration extending oppositely from both sides of said first rectangular member via two lengthwise lines of fold thereof;
   (b) a first trapezoidal member connected upwardly to said first rectangular member along one widthwise line of fold thereof, and including two trapezoidal flaps of substantially identical configuration extending oppositely from both sides thereof via two lengthwise lines of fold thereof, said flaps each having an elongate overlap portion of substantially identical configuration connected thereto along a lengthwise line of fold thereof;
   (c) a second trapezoidal member being substantially identical in configuration and opposite to said first trapezoidal member and connected to said first rectangular member along the other widthwise line of fold thereof;
   (d) a second rectangular member connected along one widthwise line of fold thereof to said second trapezoidal member, and including a pair of openings disposed therein in spaced-apart relation to each other and in alignment with said first paired openings of said first rectangular member, a lens plate attached onto an internal surface of said second rectangular member and defining two eyepieces with said second paired openings, and two trapezoidal flaps of substantially identical configuration extending oppositely from both sides of said second rectangular member via two lengthwise lines of fold thereof; and
   (e) a third trapezoidal member being substantially identical in configuration to said first and second trapezoidal members and connected downwardly to said second rectangular member along the other widthwise line of fold thereof, whereby said binocular when assembled is in the form of a hexahedral frustum of a pyramid.

2. The binocular assembly according to claim 1, wherein said trapezoidal flaps extending from the first and the second rectangular members are formed with slits which are arranged to bite each other when assembled.

3. The binocular assembly according to claim 1, wherein said second rectangular member has a height equal to the width of an upper side of each of said trapezoidal flaps of said first trapezoidal member.

4. The binocular assembly according to claim 1, wherein each of said lens plates is made of acrylic resin.

* * * * *